United States Patent
Peng et al.

(10) Patent No.: US 9,263,076 B1
(45) Date of Patent: Feb. 16, 2016

(54) HEATSINK FOR HEAT ASSISTED MAGNETIC RECORDING MEDIA

(71) Applicant: Seagate Technology LLC, Cupertino, CA (US)

(72) Inventors: Yingguo Peng, San Ramon, CA (US); Kai Chieh Chang, Pleasanton, CA (US); Yinfeng Ding, Fremont, CA (US); Ganping Ju, Pleasanton, CA (US); Yukiko Kubota, Campbell, CA (US); Timothy J. Klemmer, Fremont, CA (US); Jan-Ulrich Thiele, Sunnyvale, CA (US); Qihong Wu, Dublin, CA (US); Xiaobin Zhu, San Ramon, CA (US)

(73) Assignee: Seagate Technology LLC, Cupertino, CA (US)

( * ) Notice: Subject to any disclaimer, the term of this patent is extended or adjusted under 35 U.S.C. 154(b) by 153 days.

(21) Appl. No.: 13/789,326

(22) Filed: Mar. 7, 2013

Related U.S. Application Data (60) Provisional application No. 61/740,956, filed on Dec. 21, 2012.

(51) Int. Cl.
| | |
|---|---|
| *G11B 5/66* | (2006.01) |
| *G11B 5/738* | (2006.01) |
| *F28D 20/00* | (2006.01) |
| *G11B 5/84* | (2006.01) |
| *G11B 5/73* | (2006.01) |

(52) U.S. Cl.
CPC ............. *G11B 5/738* (2013.01); *F28D 20/0056* (2013.01); *G11B 5/7325* (2013.01); *G11B 5/8404* (2013.01)

(58) Field of Classification Search
CPC ............. G11B 11/10582; G11B 11/10584; G11B 11/10586; G11B 5/66; G11B 5/7325; G11B 5/732; G11B 5/738
USPC ............. 369/13.35, 13.14; 360/59; 428/831, 428/831.2
See application file for complete search history.

(56) References Cited

U.S. PATENT DOCUMENTS

| | | | |
|---|---|---|---|
| 7,829,208 B2 | 11/2010 | Peng et al. | |
| 7,862,914 B2 | 1/2011 | Kubota et al. | |
| 8,765,273 B1* | 7/2014 | Kubota et al. | 428/831.2 |
| 2005/0221049 A1 | 10/2005 | Inoue et al. | |
| 2007/0026263 A1* | 2/2007 | Kubota et al. | 428/832 |
| 2011/0020670 A1 | 1/2011 | Peng et al. | |
| 2011/0043941 A1 | 2/2011 | Champion et al. | |
| 2012/0251842 A1* | 10/2012 | Yuan et al. | 428/800 |
| 2013/0288079 A1* | 10/2013 | Chang et al. | 428/828 |
| 2013/0314815 A1* | 11/2013 | Yuan et al. | 360/59 |
| 2014/0099517 A1* | 4/2014 | Hu et al. | 428/831 |

OTHER PUBLICATIONS

Chin-An Chang, Appl Phys Lett, vol. 57, No. 3, Jul. 1990, pp. 297-299.*

Borsa et al., IEEE Trans Magn, vol. 38, No. 5, Sep. 2002, pp. 2709-2711.*

(Continued)

*Primary Examiner* — Holly Rickman
(74) *Attorney, Agent, or Firm* — Hollingsworth Davis, LLC (57) ABSTRACT

A magnetic stack includes a heatsink layer comprising (200) Cu or (200) CuX, a magnetic recording layer, and an interlayer disposed between the heatsink layer and the magnetic recording layer.

19 Claims, 6 Drawing Sheets

(56) References Cited

OTHER PUBLICATIONS

Concordia University, http://users.encs.concordia.ca/~woodadam/MECH221/Course_Notes/Crystal%20directions%20and%20planes.pdf, Sep. 2008, pp. 1-16.*

"Miller Index Notation," Queen Mary, Univeristy of London, http://www.chem.qmul.ac.uk/surfaces/scc/scat1_1b.htm, Jul. 2015, pp. 1-5.*

University of Cambridge, http://www.doitpoms.ac.uk/tlplib/miller_indices/printall.php, Jul. 2015, pp. 1-22.*

* cited by examiner

HEATSINK FOR HEAT ASSISTED MAGNETIC RECORDING MEDIA

RELATED APPLICATIONS

This application claims the benefit of Provisional Patent Application Ser. No. 61/740,956 filed on Dec. 21, 2012, to which priority is claimed pursuant to 35 U.S.C. §119(e) and which is hereby incorporated herein by reference in its entirety.

SUMMARY

Various embodiments involve a magnetic stack that includes a heatsink layer comprising (200) Cu or (200) CuX, a magnetic recording layer, and an interlayer disposed between the heatsink layer and the magnetic recording layer. These and other features can be understood in view of the following detailed discussion and the accompanying drawings.

Like references numbers refer to similar structures.

The drawings are not necessarily to scale unless otherwise indicated.

DETAILED DESCRIPTION

Higher areal density for magnetic storage motivates technological advances toward decreasing the size of magnetic grains used for magnetic recording media. As grain sizes with a given magnetic anisotropy energy decrease in volume, eventually a thermal stability limit is reached at which random thermal fluctuations at room temperature result in magnetization reversal and corresponding loss of data reliability. To increase the thermal stability limit, materials having higher magnetic anisotropy energy at room temperature can be used to form the magnetic grains. However, high anisotropy particles require a relatively high write field to change the magnetization orientation of the particles. Writing data to high magnetic anisotropy materials can be achieved using some type of energy assistance to temporarily reduce the magnetic anisotropy energy of the materials while the magnetic write field is applied. For example, one form of energy assisted magnetic recording involves laser light applied to the magnetic medium in a localized area in synchrony with the writing magnetic field. The laser light locally heats the magnetic material to lower the magnetic anisotropy of the medium, thus allowing the writing of data by the magnetic writing field. Heat assisted magnetic recording (HAMR) media may incorporate materials and structures to accommodate the relatively high temperatures and high magnetic anisotropies used in the writing process. Formation of the very small, high anisotropy materials used for HAMR involves a structure that provides appropriate orientation, topographical, diffusion, thermal, and other characteristics.

HAMR systems require the spatial and temporal variations of the heat profile to be managed. In particular, lateral heat diffusion in HAMR media is an important requirement for confining the heated region in the media to desired dimensions. Other important aspects of HAMR are the efficiency of the heat delivery system and the cooling rate of the media. Whereas the heating has to be powerful enough to heat the media to the desired temperatures (at least close to the Curie point), the cooling rate has to be fast enough to avoid thermal destabilization of the written information during the time the media cools down. Both issues, efficiency of the heat delivery system and fast cooling rate, are mutually competitive—the faster the cooling rate the more heating power is required to achieve a certain temperature increase. Heatsink layers can be used in HAMR media to facilitate thermal management.

Copper (Cu) and/or CuX (e.g., CuX, where X can be any soluble element(s) less than about 50 molecular percent), provides sufficiently high thermal conductivity to be useful for a HAMR heat sink layer. However, layers of Cu and CuX typically grow in (111) orientation. Magnetic stacks that include (111) heatsink layers may employ one or more additional layers disposed on the heatsink layer that provides or resets the growth orientation for subsequent layers in the magnetic stack, e.g., the magnetic recording layer, which are grown over the heatsink layer in (200) orientation for $L1_0$ phases. Where (111) oriented heatsink layers are used, the magnetic layers would typically not grow with the optimal orientation for magnetic recording unless the one or more additional orientation layers are used. Furthermore, it can be difficult to grow (111) oriented heatsink layers with low roughness. Embodiments described herein involve approaches for forming (200) Cu or (200) CuX heatsink layers that are useful for HAMR implementations. The (200) Cu or CuX heatsink layers disclosed herein provide suitable thermal conductivity, e.g., in a range of about 100 W/m-K to about 400 W/m-K, and additionally provide an orientation template that produces a magnetic recording layer having a lower roughness when compared to magnetic recording layers grown on (111) oriented heatsink layers.

Figure 1:
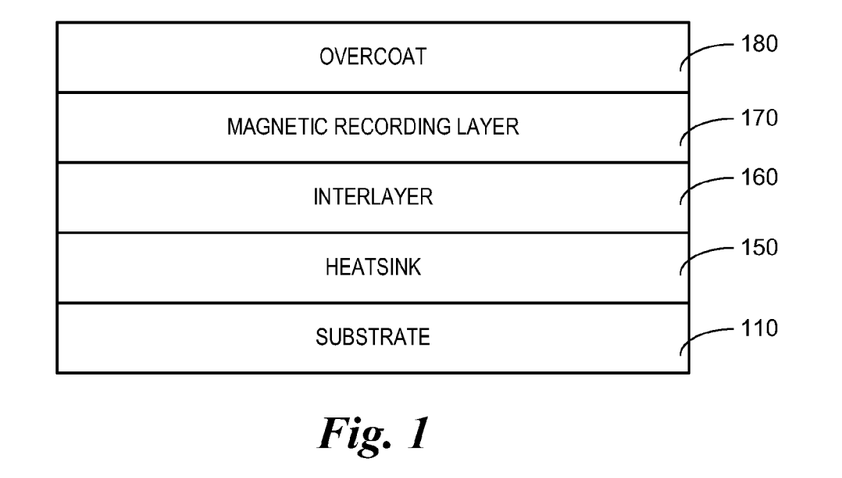
FIGS. 1 and 2 are cross sectional diagrams of magnetic stacks that include heatsink layers according to some embodiments.
Figure 2:
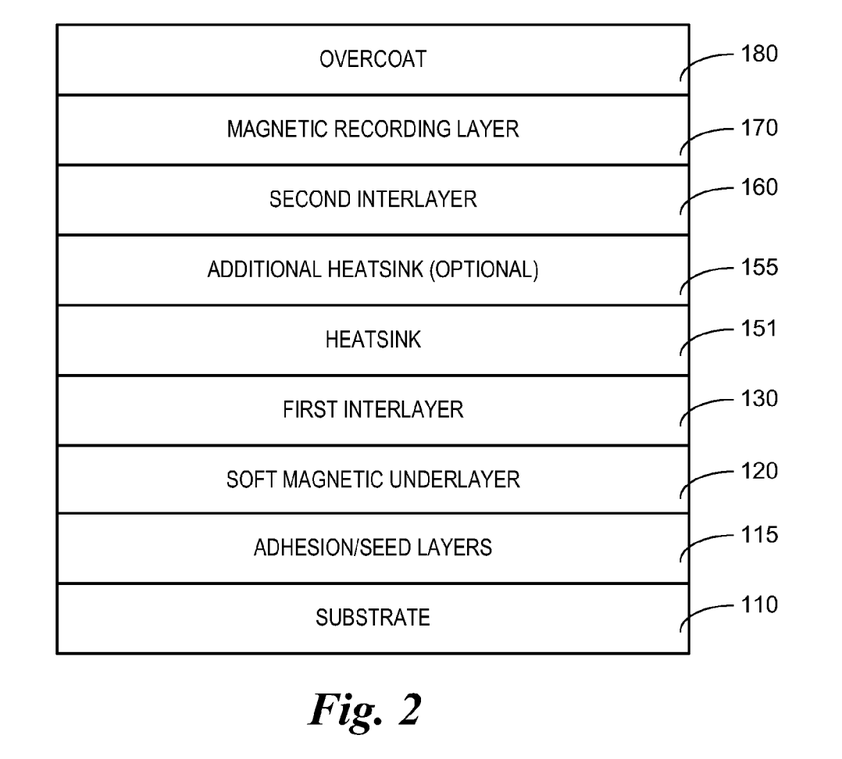

FIGS. 1-2 are cross section diagrams illustrating stacks in accordance with some embodiments. FIG. 1 shows a heatsink layer 150 comprising a metal and/or metal alloy (e.g., Cu or CuX) grown with (200) orientation over or on a substrate 110. The substrate 110 may include any suitable substrate material such as ceramic glass, amorphous glass, aluminum or NiP coated AlMg. In some cases, one or more interlayers, seed layers, adhesion layers, and/or other layers may be formed between the substrate 110 and the heatsink layer 150.

The (200) oriented metal of the heatsink layer 150 may be a (200) Cu layer (e.g., pure Cu with trace (i.e., functionally insignificant) amounts of other elements and/or the (200) oriented metal may be CuX, such as CuZr, having Zr in a range of about 0.01 atm. % to about 1 atm. %, e.g., 0.3 or 0.5 atm. % where the balance of the CuZr alloy is Cu. Cu and CuX nitride can grow in a (200) orientation. As described in more detail below, a (200) Cu or (200) CuX layer may be formed by growing a (200) Cu nitride layer or (200) CuX nitride layer, and, after growing the (200) Cu nitride or CuX nitride layer, facilitating the release of the nitrogen from the Cu nitride phase of the layer. This process results in a (200) Cu layer or (200) CuX layer, without sufficient Cu nitride phase material remaining in the layer to substantially affect the hardness and/or thermal conductivity of the layer. Release of the nitrogen may be facilitated by heating the (200) Cu or CuX nitride layer. Such heating may occur during processing of subsequently formed layers of the stack. The heatsink layer 150 may have a thickness in a range of about 5 to about 200 nm, for example, in some cases a thickness of about 30 nm may be suitable for the heatsink layer 150.

The Cu nitride layer or CuX nitride layer which is grown in the initial processing of the heatsink layer has a (200) growth orientation which, as previously discussed, can be helpful for orientation of subsequently deposited magnetic layers. The Cu nitride layer or CuX nitride layer may have relatively low thermal conductivity, e.g., less than about 50 W/m-K. Transforming the (200) Cu nitride layer or (200) CuX nitride layer into a heatsink layer of (200) Cu or (200) CuX can increase the thermal conductivity of the heatsink layer, while retaining the (200) orientation and the low roughness characteristic of the Cu nitride phase intact. The (200) orientation of the Cu or CuX heatsink layer can facilitate the growth of the subsequent layers including the interlayer 160 and magnetic recording layer 170.

The interlayer 160 may comprise MgO or other layer that serves to reduce or prevent interdiffusion between the heatsink 150 and the magnetic recording layer 170. Interlayer 160 may also enhance the surface topography that facilitates the growth of the magnetic recording layer 170. The magnetic recording layer 170 has a typical thickness of from about 2 to about 50 nm or between about 3 to about 30 nm, and may comprise materials having relatively high anisotropies at ambient temperature, such as CoPt, FePt, FeNiPt, CoCrPt and RECo (e.g., $SmCo_5$ or $YCo_5$) alloys, and/or Co/Pt or Co/Pd multilayers. Note that in some implementations, the magnetic recording layer comprises a $L1_0$ phase FePt recording layer. $L1_0$ FePt has a relatively high magnetic moment and magnetocrystalline anisotropy energy, $K_u$, making it useful as a high areal density magnetic recording layer. In further embodiments, the hard magnetic layer may comprise one or more additives such as Ag, Au, Cu, Ni, B, oxides, carbon, nitrides, or carbides (FePt:X). In a particular embodiment, the hard magnetic layer comprises one or more layers of FePt:X, with varying ratios of FePt and X. In still further embodiments, the magnetic recording layer 170 may include a capping layer, which is magnetically softer than the hard magnetic layer and enhances the switching field distribution, may be applied to the hard magnetic layer. Such capping layers include layers of FePt, CoPt, or alloys of FePt or CoPt with additives such as Ag, Au, Ni, Cu, B. The overcoat 180 may include a layer made of any suitable material such as diamond-like carbon or silicon nitride (SiN) and may also include a lubricant layer.

FIG. 2 illustrates a stack that is similar in many respects to the stack of FIG. 1, having a substrate 110, second interlayer 160, magnetic recording layer 170, and overcoat 180. These layers 110, 160, 170, 180 may have characteristics and materials similar to layers with the same reference numbers described in connection with FIG. 1. FIG. 2 shows the heatsink layer as a multi-layer structure including, in this example, two layers, heatsink layer 151 and an optional additional heatsink layer 155. In some cases, the first heatsink layer 151 may be similar in composition to the heatsink layer 150 described in connection with FIG. 1, but may have different thickness. In some configurations, layer 151 may comprise (200) Cu or (200) CuX such as CuZr.

In some implementations, the additional heatsink layer 155 may comprise materials that are different from those of layer 151. For example, in some arrangements, the additional heatsink layer 155 may comprise (200) $Cu_{100-x}Ni_x$, where x is in a range of about 5 to about 50. During growth of the additional heatsink layer 155, the (200) texture of the additional heatsink layer 155 is propagated from the (200) oriented heatsink layer 151 below. Thus, in contrast to the first heatsink layer 151, the additional heatsink layer 155 may not initially include the copper nitride phase and still achieves the (200) orientation due to propagation of this orientation from the heatsink layer(s) below.

The stack of FIG. 2 shows seed and/or adhesion layers disposed between the substrate 110 and the heatsink layer 151. For example, an adhesion layer, e.g. a tantalum layer, having a thickness of about 3.5 nm, may be disposed on the substrate to promote adhesion between the substrate and an adjacent layer. The adhesion layer is used to reduce the potential for delamination of the substrate from the rest of the stack. The stack may include a seed layer disposed over the adhesion layer, where the seed layer initiates appropriate growth orientation for the layers above.

The stack of FIG. 2 includes a soft magnetic underlayer [SUL] 120 arranged to function as a return path for magnetic flux produced by the magnetic write field during a write operation. The SUL 120 may comprise amorphous and/or crystalline materials may have a typical thickness of from about 5 nm to about 500 nm, or even 1,000 nm. For example, the SUL 120 may be made of any suitable material such as CoFe, FeCoB, FeAlN, FeAlSi, NiFe, CoZrNb or FeTaN. The SUL 120 may also comprise laminated structures and/or may comprise antiferromagnetically coupled (AFC) SUL layers The first interlayer 130 may comprise a layer of MgO and/or other suitable materials interposed between the SUL 120 and the heatsink 151. In this configuration, the first interlayer 130 is arranged to prevent or reduce diffusion of materials between the SUL 120 and the heatsink 151 and also serves to enhance the (200) growth of the copper nitride phase during formation of the heatsink layer 151.

Figure 3:
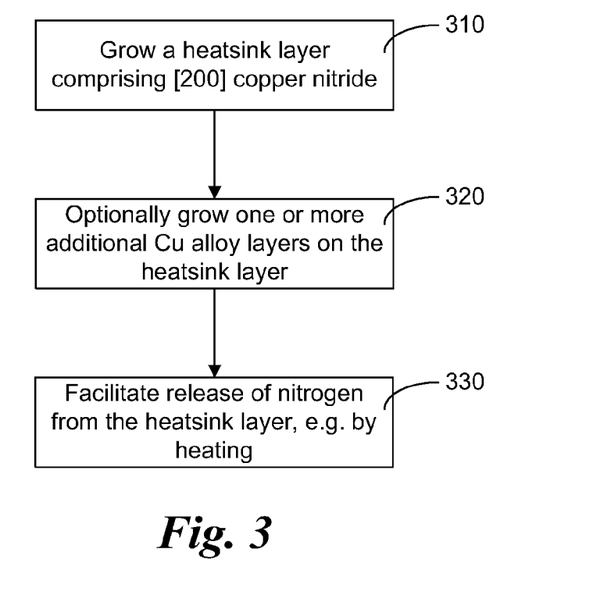
FIG. 3 is a flow diagram illustrating a process for forming a (200) Cu or (200) CuX heat sink layer according to some embodiments.

FIG. 3 shows a flow diagram of a process for forming heatsink layers as discussed herein. The process includes growing 310 a heatsink layer that may include Cu or CuX, e.g., CuZr, and comprising a sufficient amount of Cu nitride phase to cause the heatsink layer to grow in the (200) fcc orientation. Cu nitride can be grown having (200) orientation on an amorphous layer or on (200) crystalline MgO, for example. As previously discussed, the thermal conductivity characteristics of copper nitride makes it suboptimal for use as a heatsink layer for HAMR applications. According to the approach illustrated in FIG. 3, optionally one or more additional heatsink layers, e.g., CuX layers such as CuNi alloy, may be grown 320 on the copper nitride layer. These additional layers may not contain the copper nitride phase and grow in the (200) orientation because these layers propagate the (200) orientation initiated by the copper nitride layer below. Nitrogen is released from the copper nitride layer as the material in the heatsink layer changes phase from Cu nitride phase to Cu or CuX phase, while retaining the (200) orientation of the Cu nitride phase. Release of nitrogen from the heatsink layer may be facilitated 330 by heating the heatsink layer. For example, in some cases, the heating may occur during deposition of layers in the stack that are formed subsequent to formation of the copper nitride heatsink layer. In some approaches, the heating occurs during formation of the magnetic recording layer.

Figure 4:
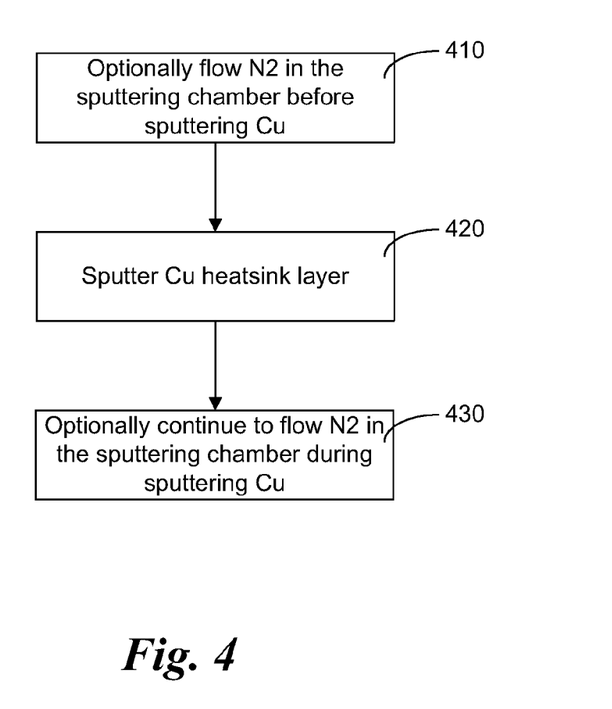
FIG. 4 is a flow diagram illustrating a method of growing a (200) copper nitride layer in accordance with some embodiments.

The flow diagram of FIG. 4 illustrates a process for growing the heatsink layer that includes a sufficient amount of copper nitride phase to provide the (200) growth orientation. In some cases, the amount of copper nitride phase in the heat sink layer may be controlled mitigate the formation of bubbles. If excess nitrogen is incorporated into the heatsink layer, this excess nitrogen may cause bubbles or eruptions to form in the heatsink layer as the nitrogen exits from the heatsink layer, at elevated temperatures, which is needed, for example, to form $L1_0$ phases. Thus, a controlled process for growing the heatsink layer is employed to achieve the specified amount of nitrogen in the layer, as depicted in FIG. 4.

Optionally, $N_2$ is allowed to flow 410 into the sputtering chamber at a specified flowrate and duration prior to the sputtering operation commences. Copper is sputtered 420 on the base layer. Optionally, for at least a portion of the time that the copper is sputtered, nitrogen is allowed to flow 430 into the sputtering chamber. For example, according to some implementations, the $N_2$ flows into the sputtering chamber at flowrate 1 for a first period of time at the beginning of the sputtering operation and the $N_2$ flowrate is decreased to flowrate 2 during a second period of time that follows the first period of time. The approach illustrated by FIG. 4 provides for a controlled amount of nitrogen incorporation into the heatsink layer that provides the (200) orientation and avoids formation of excessive bubbles during the release of the nitrogen that occurs during subsequent processing.

Figure 5:
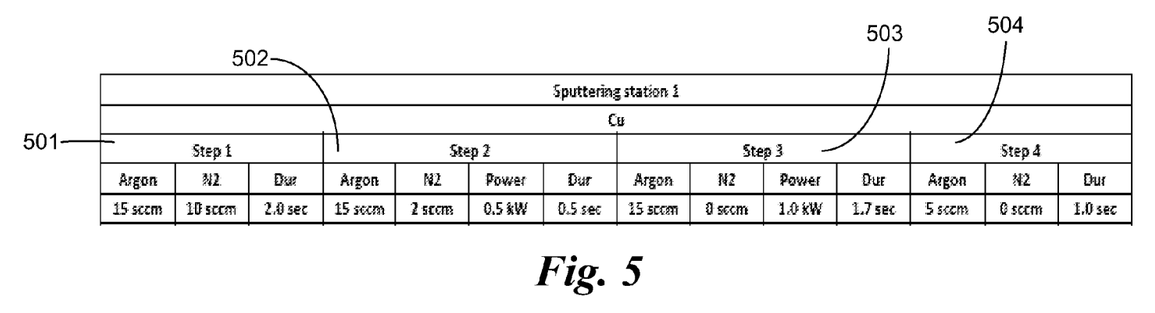
FIG. 5 is a diagram illustrating a process that can be used to produce a (200) copper nitride layer according to some embodiments.

FIG. 5 illustrates an approach to growing the heatsink layer that includes sputtering copper in the presence of $N_2$ to achieve the copper nitride phase in accordance with some embodiments. In step 1 501, argon at 15 standard cubic centimeters per minute (sccm) and $N_2$ at 10 sccm flow into the sputtering station for 2 seconds prior to commencement of sputtering. In step 2 502, Cu (or CuX) is DC sputtered for 0.5 seconds at 0.5 kW. Note that although DC sputtering is used in the examples discussed herein, AC or RF sputtering are also suitable for deposition of the heatsink layer. During step 2 502, argon continues to flow into the sputtering chamber at 15 sccm and the flowrate of the $N_2$ is decreased to 2 sccm. In step 3 503, argon continues to flow into the sputtering chamber at 15 sccm and the $N_2$ flowrate is reduced to zero. DC sputtering of the Cu continues at 1.0 kW for 1.7 seconds. In step 4 504, no sputtering occurs, the flowrate of argon is decreased to 5 sccm and the flowrate of $N_2$ remains at zero for 1 second. The approach of FIG. 5 provides a heatsink layer that initially includes the copper nitride phase in the (200) growth orientation, where subsequently the nitrogen is released from the layer, leaving a (200) oriented layer of Cu or CuX. In the resulting layer, there is insufficient copper nitride phase remaining to significantly detrimentally affect the thermal conductivity characteristics of the heatsink and/or to cause bubble defects in the stack layers.

Figure 6:
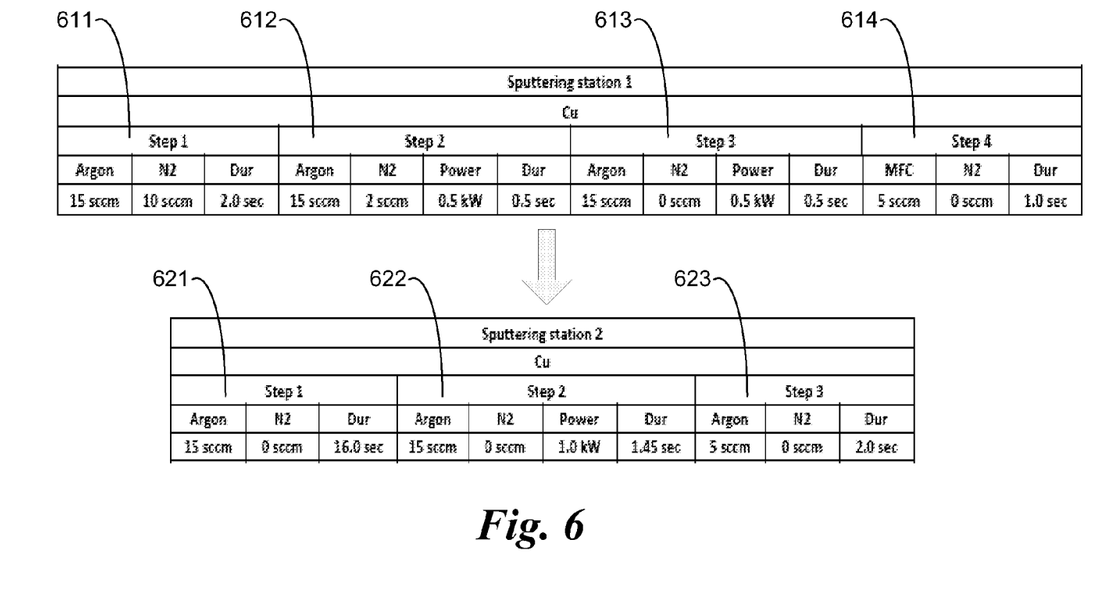
FIGS. 6 and 7 are diagrams illustrating a process that can be used to produce a bi-layer (200) oriented heatsink in accordance with some embodiments.

FIG. 6 shows another approach for forming a heatsink in accordance with some embodiments. In this approach, the copper nitride phase heatsink layer is formed in a first sputtering station (Sputtering station 1) and a second Cu or CuX heatsink layer (without copper nitride phase) is formed in a second sputtering station (Sputtering station 2). In station 1, step 1 611, argon flows at 15 sccm and $N_2$ flows at 10 sccm into sputtering station 1 for 2 seconds prior to commencement of sputtering. In station 1, step 2, Cu is DC sputtered for 0.5 seconds at 0.5 kW. During step 2 612, argon continues to flow into the sputtering chamber at 15 sccm and the flowrate of the $N_2$ is decreased to 2 sccm. In step 3 613, argon continues to flow into the sputtering chamber at 15 sccm and the $N_2$ flowrate is reduced to zero. DC sputtering of Cu continues at 0.5 kW for 0.5 seconds. In step 4 614, no sputtering occurs, the flowrate of argon is decreased to 5 sccm and the flowrate of $N_2$ remains at zero for 1 second.

The stack subassembly produced in sputtering station 1 is moved to sputtering station 2 to continue the process of FIG. 6. In station 2, an additional heatsink layer is formed that does not include the copper nitride phase and which propagates the (200) orientation of the previously deposited heatsink layer. In station 2, step 1 621, before sputtering commences, argon flows into sputtering station 2 at 15 sccm and no $N_2$ flows into the sputtering station 2 for a duration of 16 seconds. During step 2 622, Cu is DC sputtered for 1.45 seconds at 1.0 kW. During step 2 622, argon continues to flow into the sputtering station 2 at 15 sccm and the flowrate of the $N_2$ remains zero. In station 2, step 3 623, no sputtering occurs, the flowrate of argon is decreased to 5 sccm and the flowrate of $N_2$ remains at zero for 1 second.

Figure 7:
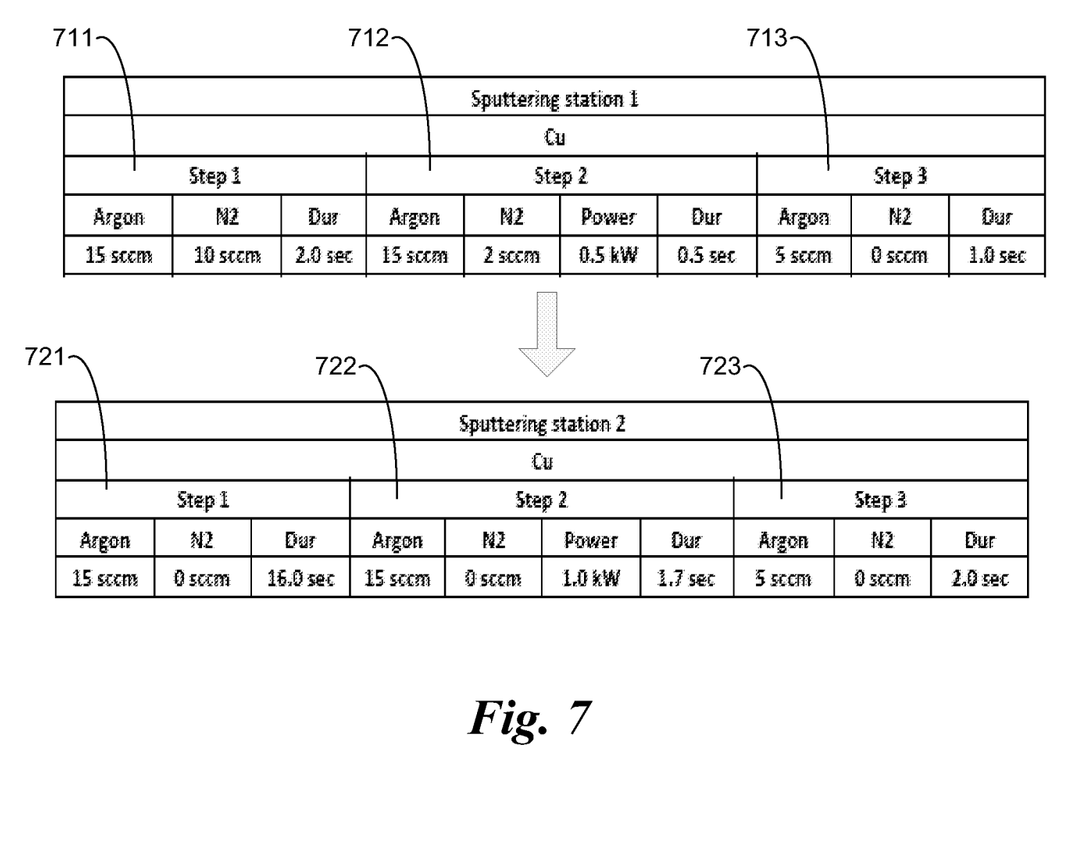

FIG. 7 illustrates an alternate method of forming the heatsink layer and additional heatsink layer in separate sputtering stations. In station 1, the heatsink layer that includes copper nitride phase is formed. In station 1, step 1 711, argon flows at 15 sccm and $N_2$ flows at 10 sccm into sputtering station 1 for 2 seconds prior to commencement of sputtering. In station 1, step 2 712, Cu is DC sputtered for 0.5 seconds at 0.5 kW. During step 2 712, argon continues to flow into the sputtering chamber at 15 sccm and the flowrate of the $N_2$ is decreased to 2 sccm. In step 3 713, no sputtering occurs, the flowrate of argon is decreased to 5 sccm and the flowrate of $N_2$ is decreased to zero for 1 second.

The stack subassembly produced in sputtering station 1 is moved to sputtering station 2 to continue the process of FIG. 7. In station 2, an additional heatsink layer is formed that does not include the copper nitride phase and which propagates the (200) orientation of the previously deposited copper nitride phase heatsink layer. In station 2, step 1 721, before sputtering commences, argon flows into the sputtering chamber at 15 sccm and no $N_2$ flows into the sputtering chamber for a duration of 16 seconds. During step 2 722, Cu is DC sputtered for 1.7 seconds at 1.0 kW. During step 2 722, argon continues to flow into the sputtering chamber at 15 sccm and the flowrate of the $N_2$ remains zero. In station 2, step 3 723, no sputtering occurs, the flowrate of argon is decreased to 5 sccm and the flowrate of $N_2$ remains at zero for 1 second.

During formation of the stack, subsequent layers are deposited on the heatsink layer or additional heatsink layer, if present. During formation of one or more of these subsequently deposited layers, e.g., the magnetic recording layer, the stack is heated to a temperature sufficient to release nitrogen from the copper nitride phase (e.g., more than about 100 C). Nitrogen is released from the copper nitride phase of the heatsink layer, leaving the (200) orientation of the remaining copper layer intact. The (200) Cu or CuX imparts high thermal conductivity to the heatsink layer and reduces the roughness of the subsequently grown magnetic layer when compared to a magnetic layer grown on a (111) oriented Cu layer.

Example

Six samples (T36-T41) were prepared and tested for roughness and orientation as illustrated in Table 1:

TABLE 1

| Sample | stn #1 Substrate CrTa thickness | stn #2 Ar (sccm) | N2 (sccm) | Cu thickness | N2 percent | Ar percent | Ra (nm) |
| --- | --- | --- | --- | --- | --- | --- | --- |
| T36 | 185 Å | 30 | 0 | 704 Å | 0% | 100% | 0.559 |
| T37 | 185 Å | 24 | 6 | 704 Å | 20% | 80% | 0.262 |

TABLE 1-continued

| Sample | stn #1 Substrate CrTa thickness | stn #2 Ar (sccm) | N2 (sccm) | Cu thickness | N2 percent | Ar percent | Ra (nm) |
|---|---|---|---|---|---|---|---|
| T38 | 185 Å | 18 | 12 | 704 Å | 40% | 60% | 0.204 |
| T39 | 185 Å | 12 | 18 | 704 Å | 60% | 40% | 0.217 |
| T40 | 185 Å | 6 | 24 | 704 Å | 80% | 20% | 0.202 |
| T41 | 185 Å | 0 | 30 | 704 Å | 100% | 0% | 0.166 |

Figure 8:
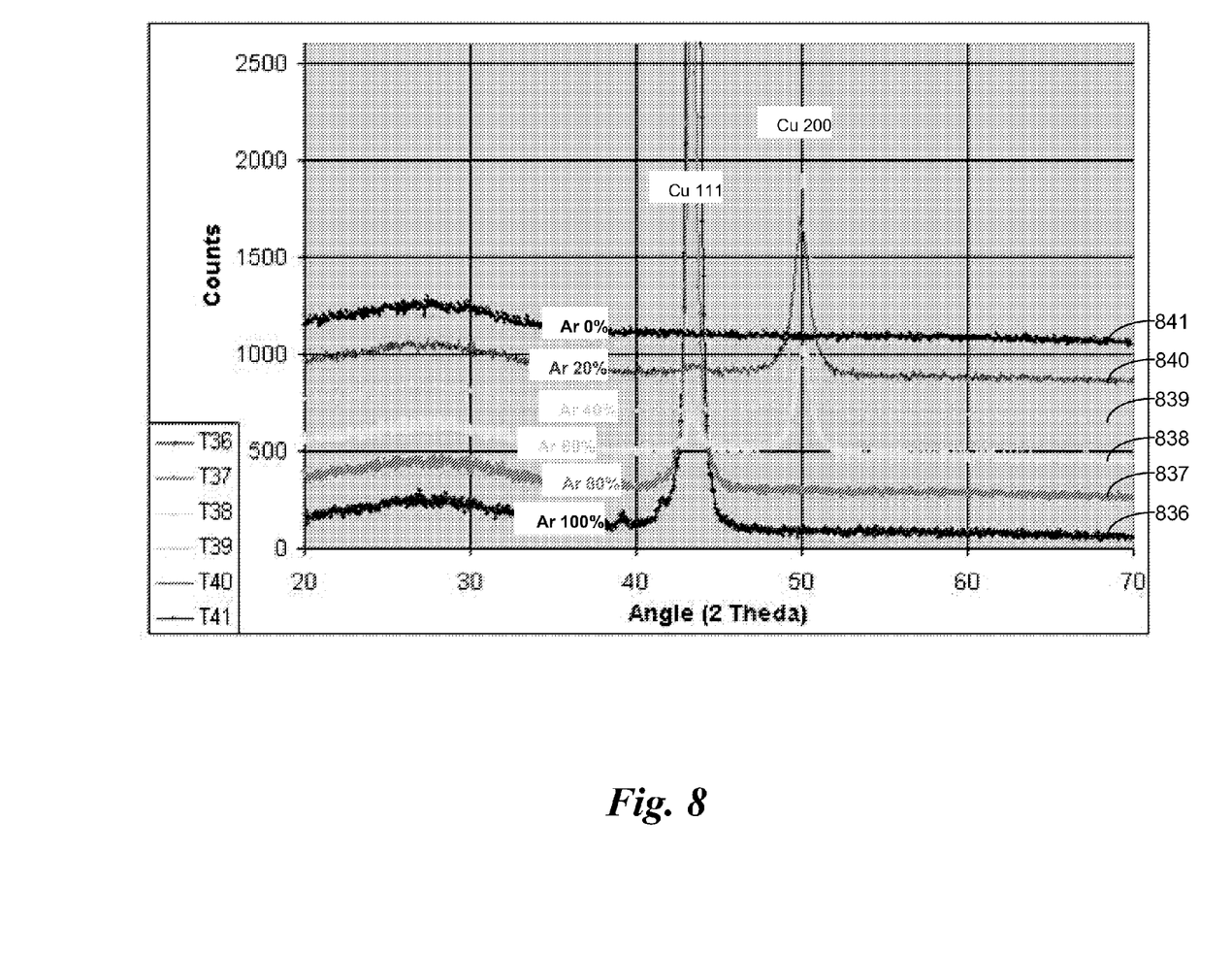
FIG. 8 shows the x-ray diffraction curves for some experimental samples produced according to the processes of some embodiments.

In this experiment, layers having a thickness of 704 angstroms were formed by sputtering Cu in different environments ranging from 0% to 100% $N_2$. The Cu layers were formed on base layers of CrTa having a thickness of 185 angstroms. The different $N_2$ environments produced different amounts of copper nitride phase in the Cu layers. The orientation of the Cu layers shifted from (111) to (200) as the percentage of $N_2$ in the sputtering environment increased. FIG. 8 illustrates the graphs of x-ray diffraction (XRD) measurements for each of the samples T36-T41. As appreciated from FIG. 8, the XRD graphs 836, 837 corresponding to samples T36 and T37 which were formed in environments of 0% and 20% $N_2$, respectively, exhibit strong (111) orientation without indication of the (200) orientation associated with the copper nitride phase. The XRD graph 838 of sample T38, which was grown in a 40% $N_2$ environment, shows mixed (111) and (200) orientations. The XRD graphs 839, 840 of samples T39 and T40 exhibit strong (200) orientation associated with the copper nitride phase with little indication of the (111) orientation. Sample T41 was grown in 100% $N_2$ and does not exhibit either (111) or (200) orientation, likely because the 100% $N_2$ environment poisoned the sputter targets, a phenomenon that appears to be present to some degree in sample T40. This experiment indicates that Cu layers grown in environments having greater than about 40% but less than about 95-100% $N_2$ include sufficient copper nitride phase such that the (200) orientation is predominant.

Figure 9:
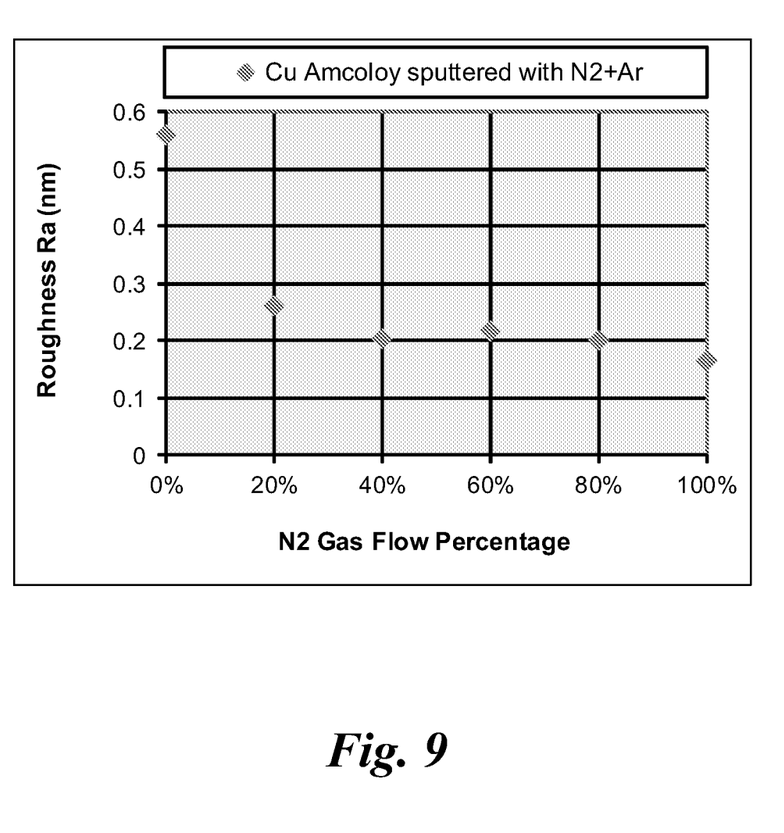
FIG. 9 shows the roughness characteristics of the samples of FIG. 8 as measured by atomic force microscopy (AFM).

The (200) copper nitride phase leads to decreased roughness, as indicated with the graph shown in FIG. 9. FIG. 9 plots the roughness as determined from atomic force microscopy (AFM) measurements as a function of $N_2$ gas flow percentage. According to this experiment, samples grown in an environment of greater than 20% $N_2$ had roughness less than about 0.3 nm; samples grown in an environment of greater than 40% $N_2$ has roughness less than 0.25 nm. Note that in general nitrogen from the Cu nitride phase does not exit the stack unless the stack is heated. Some amount of stable Cu nitride phase can be tolerated in the stack without significant degradation of heatsink properties. For heat assisted magnetic recording (HAMR) applications, heating of the stack occurs during formation of the magnetic layer, e.g., an $L1_0$ phase magnetic layer, involves heating the magnetic stack to form the magnetic layer and/or during the heat assisted recording process. Since heating of the magnetic stack occurs, it can be helpful to use a minimal amount of Nitrogen to reduce the chance of forming bubbles. in the stack. Once the nitrogen is driven out of the magnetic stack, a Cu layer of high thermal conductivity remains.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A stack, comprising:
a heatsink layer comprising (200) Cu or (200) CuX;
a magnetic recording layer;
an interlayer between the heatsink layer and the magnetic recording layer; and
an additional heatsink layer having a (200) orientation adjacent the heatsink layer;
wherein the material of the additional heatsink layer differs from that of the heatsink layer.

2. The stack of claim 1, wherein the interlayer comprises a (200) interlayer comprising MgO.

3. The stack of claim 1, wherein X comprises less than about 50 molecular percent of a soluble element.

4. The stack of claim 1, further comprising:
a soft magnetic layer (SUL); and
an interlayer disposed between the SUL and the heatsink layer, the interlayer configured to enhance the (200) growth of a copper nitride phase during formation of the heatsink layer.

5. The stack of claim 1, wherein the (200) CuX comprises CuZr.

6. The stack of claim 1, wherein roughness of the heatsink layer is less than about 0.3 nm.

7. The stack of claim 1, wherein the heatsink layer includes a trace amount of copper-nitride phase insufficient to substantially affect one or both of the hardness and thermal conductivity of the heatsink layer.

8. A method, comprising:
sputtering Cu in a nitrogen environment to form a layer comprising copper nitride phase;
forming an interlayer on the heatsink layer;
forming a magnetic recording layer on the interlayer;
releasing nitrogen from the copper nitride phase to form a heatsink layer of (200) Cu or (200) CuX; and
forming an additional heatsink layer having a (200) orientation between the heatsink layer and the interlayer;
wherein the material of the additional heatsink layer differs from that of the heatsink layer.

9. The method of claim 8, wherein:
sputtering Cu in the nitrogen environment comprises:
flowing a gas comprising nitrogen into the sputtering chamber before sputtering Cu; and
decreasing nitrogen flow into the sputtering chamber before or during sputtering Cu.

10. The method of claim 9, wherein flowing the gas comprising nitrogen into the sputtering chamber comprises flowing a gas comprising at least about 20% nitrogen.

11. The method of claim 9, wherein decreasing the nitrogen flow into the sputtering chamber comprises decreasing the nitrogen flow to zero.

12. The method of claim 9, wherein decreasing the nitrogen flow comprises stepping down the nitrogen flow while sputtering Cu.

13. The method of claim 8, wherein X comprises Zr.

14. The method of claim 8, wherein forming the additional heatsink layer comprises sputtering Cu in an inert gas environment.

15. The method of claim 8, wherein releasing nitrogen comprises heating the layer that includes the copper nitride phase.

16. The method of claim 15, wherein heating the heatsink layer comprises heating the heatsink layer during the forming of the magnetic recording layer.

17. The method of claim 8, wherein forming the heatsink layer comprises forming the heatsink layer on an amorphous substrate or on a (200) interlayer comprising MgO.

18. The stack of claim 1, wherein the additional heatsink layer comprises (200) CuX.

19. The stack of claim 18, wherein the additional heatsink layer comprises (200) CuNi.

* * * * *